(12) United States Patent
Gianchandani et al.

(10) Patent No.: US 11,927,574 B2
(45) Date of Patent: Mar. 12, 2024

(54) PROGRESSIVE CELLULAR ARCHITECTURE FOR MICROFABRICATED GAS CHROMATOGRAPH

(71) Applicant: THE REGENTS OF THE UNIVERSITY OF MICHIGAN, Ann Arbor, MI (US)

(72) Inventors: Yogesh B. Gianchandani, Ann Arbor, MI (US); Yutao Qin, Ann Arbor, MI (US); Weilin Liao, Ann Arbor, MI (US); Hsueh-Tsung Lu, Ann Arbor, MI (US); Declan Winship, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 504 days.

(21) Appl. No.: 17/120,920

(22) Filed: Dec. 14, 2020

(65) Prior Publication Data
US 2021/0096111 A1    Apr. 1, 2021

Related U.S. Application Data

(63) Continuation-in-part of application No. 15/978,744, filed on May 14, 2018, now Pat. No. 10,866,220.
(Continued)

(51) Int. Cl.
*G01N 30/60* (2006.01)
*G01N 30/02* (2006.01)
(Continued)

(52) U.S. Cl.
CPC ......... *G01N 30/6095* (2013.01); *G01N 30/08* (2013.01); *G01N 30/461* (2013.01); *G01N 2030/025* (2013.01); *G01N 2030/085* (2013.01)

(58) Field of Classification Search
CPC .. G01N 30/6095; G01N 30/461; G01N 30/78; G01N 2030/025
(Continued)

(56) References Cited

U.S. PATENT DOCUMENTS 5,198,115 A    3/1993   Stalling et al.
5,300,758 A *  4/1994   Rounbehler .......... G01N 30/84
                                                    219/505
(Continued)

FOREIGN PATENT DOCUMENTS

CN    203241391 U  * 10/2013
CN    203242599 U  * 10/2013
(Continued)

OTHER PUBLICATIONS

Translation JP-2002202287 (Year: 2002).*
(Continued)

*Primary Examiner* — Mischita L Henson
*Assistant Examiner* — Monica S Young
(74) *Attorney, Agent, or Firm* — Harness, Dickey & Pierce, P.L.C.

(57) ABSTRACT

A progressive cellular architectures has been presented for vapor-phase chemical analyzers. The progressive cellular architecture consists of a series of heterogeneous micro-gas chromatography cells. Each individual cell targets vapor species within a specific volatility range by using a unique combination of a preconcentrator and a separation column. The cells are connected progressively in series to cover a broad range of volatile analyte chemical vapors. Valves may inadvertently absorb or adsorb and subsequently release target chemical analyte molecules, thereby interfering with quantitative analysis. Therefore, the inlet to the cells is configured without a valve.

19 Claims, 8 Drawing Sheets

Related U.S. Application Data (60) Provisional application No. 62/506,340, filed on May 15, 2017.

(51) Int. Cl.
   G01N 30/08 (2006.01)
   G01N 30/46 (2006.01)

(58) Field of Classification Search
   USPC ....................................... 73/23.39
   See application file for complete search history.

(56) References Cited

U.S. PATENT DOCUMENTS

| | | | |
|---|---|---|---|
| 5,547,497 A * | 8/1996 | Klemp | G01N 30/12 |
| | | | 95/82 |
| 6,455,003 B1 * | 9/2002 | Anvia | G01N 1/40 |
| | | | 436/178 |
| 6,666,907 B1 | 12/2003 | Manginell et al. | |
| 7,281,408 B2 * | 10/2007 | Srinivasan | G01N 30/18 |
| | | | 422/89 |
| 7,343,779 B1 * | 3/2008 | Yu | G01N 30/08 |
| | | | 95/82 |
| 7,608,818 B2 * | 10/2009 | Miller | G01N 30/30 |
| | | | 250/281 |
| 7,654,130 B2 | 2/2010 | Shah et al. | |
| 8,020,426 B2 | 9/2011 | Gross | |
| 9,714,925 B2 | 7/2017 | Akmal et al. | |
| 2002/0054832 A1 * | 5/2002 | Amirav | G01N 30/68 |
| | | | 422/89 |
| 2005/0269264 A1 * | 12/2005 | Fermier | G01N 30/36 |
| | | | 210/136 |
| 2009/0150087 A1 | 6/2009 | Steinecker | |
| 2009/0158820 A1 * | 6/2009 | Bostrom | G01V 9/00 |
| | | | 73/61.53 |
| 2010/0250146 A1 * | 9/2010 | Alm | G01N 30/463 |
| | | | 73/23.4 |
| 2011/0088452 A1 | 4/2011 | Kim et al. | |
| 2011/0259081 A1 | 10/2011 | Chou et al. | |
| 2013/0125620 A1 * | 5/2013 | Ovadia | G01N 30/08 |
| | | | 73/23.39 |
| 2014/0151546 A1 * | 6/2014 | Li | G01N 30/7206 |
| | | | 250/288 |
| 2014/0260535 A1 | 9/2014 | McGill et al. | |
| 2014/0298990 A1 | 10/2014 | Fan et al. | |
| 2015/0143872 A1 * | 5/2015 | Hassan | G01N 30/76 |
| | | | 73/23.4 |
| 2015/0153299 A1 | 6/2015 | Chou et al. | |
| 2017/0284978 A1 * | 10/2017 | Cardin | G01N 30/30 |
| 2018/0172646 A1 * | 6/2018 | Hall | G01N 30/14 |
| 2019/0154638 A1 * | 5/2019 | Cardin | G01N 30/461 |
| 2019/0265214 A1 * | 8/2019 | Rubenstein | B01J 20/283 |
| 2020/0033301 A1 | 1/2020 | Cardin | |

FOREIGN PATENT DOCUMENTS

| | | | | |
|---|---|---|---|---|
| CN | 114354829 A | * | 4/2022 | |
| GB | 2250633 A | * | 6/1992 | ............ G01M 3/202 |
| JP | H06194351 A | * | 7/1994 | |
| JP | 2002202287 A | * | 7/2002 | |
| JP | 2004286698 A | * | 10/2004 | |
| WO | WO-2014186720 A2 | * | 11/2014 | ........ B01L 3/502707 |
| WO | WO-2020170070 A1 | * | 8/2020 | ............ G01N 1/405 |

OTHER PUBLICATIONS

Translation JP-H06194351 (Year: 1994).*
Translation CN-203241391 (Year: 2013).*
Serrano G et al "Comprehensive Two-Dimensional Gas Chromatographic Separations With a Microfabricated Thermal Modulator", Anal. Chem., 84 (6) (2012).
Collin WR et al. "Comprehensive two-dimensional gas chromatographic separations with a temperature programmed microfabricated thermal modulator," J. Chromatogr A. 29, (2016).
Collin WR et al "uGC x uGC: comprehensive two-dimensional gas chromatographic separations with microfabricated components", Anal Chem 87 (3) (2015).
Liu et al "Demonstration of Motionless Knudsen Pump Based Micro-Gas Chromatography Featuring Micro-Fabricated Columns and On-Column Detectors", Lab Chip 11(20):3487-92 (Oct. 21, 2011).

* cited by examiner

PROGRESSIVE CELLULAR ARCHITECTURE FOR MICROFABRICATED GAS CHROMATOGRAPH

CROSS-REFERENCE TO RELATED APPLICATIONS

This application is a continuation-in-part of U.S. patent application Ser. No. 15/978,744 filed on May 14, 2018. The entire disclosure of this application is incorporated herein by reference.

FIELD

The present disclosure relates to a progressive cellular architecture for microfabricated gas chromatography.

BACKGROUND

Analyses of very complex mixtures of volatile organic compounds (VOCs) and even semivolatiles typically require the use of gas chromatography. In conventional gas chromatography, the vapor mixtures are separated in a long separation column coated with a stationary phase material. Some gas chromatographs incorporate columns with both non-polar and polar stationary phases, allowing species to be separated not only on the basis of volatility but also on the basis of molecular polarity, thereby providing multi-dimensional separation.

However, the conventional architectures for both uni- and multi-dimensional gas chromatography must compromise between the effectiveness of separation for a wide range of VOCs and the overall separation time. The separation of high-volatility compounds in a vapor mixture typically requires a very long column—typically 10-60 m—that is coated with a highly retentive stationary phase that is comprised of a highly porous layer or a thick layer of an adsorptive material like silicone. In order to elute the low-volatility compounds, which are also present in the same vapor mixture and strongly retained by the stationary phase, the column must be elevated to a temperature of 200-300° C., which consumes substantial power and which may also cause degradation of stationary phase. Additionally, the use of the long column presents a pressure load that requires the use of a gas pump with relatively high power consumption, or the use of a pressurized carrier gas cylinder, which is a consumable item. Thus, conventional architectures for gas chromatography present a fundamental compromise between time or energy consumed per analysis and the volatility range of compounds that can be separated.

More recently, progressive cellular architectures have been proposed for vapor-phase chemical analyzers. The basic progressive cellular architecture (PCA) consists of a series of heterogeneous micro-gas chromatography cells. Each individual cell targets vapor species within a specific volatility range by using a unique combination of a preconcentrator and a separation column. The cells are connected progressively in series to cover a broad range of volatile analyte chemical vapors. This disclosure sets forth various improvements to the progressive cellular architecture for gas chromatography.

This section provides background information related to the present disclosure which is not necessarily prior art.

SUMMARY

This section provides a general summary of the disclosure, and is not a comprehensive disclosure of its full scope or all of its features.

In one aspect, a gas chromatography architecture is presented. The gas chromatography is generally of two or more preconcentrators coupled together in series, and a separation column associated with each preconcentrator. The two or more preconcentrators have an inlet configured without a valve therein to receive an analyte and an outlet. Each preconcentrator comprising a chamber through which the analyte passes and sorbent material within the chamber, where the surface area of sorbent material residing in a given preconcentrator increases from the inlet to the outlet across the two or more preconcentrators.

The gas chromatography further includes a sampling pump fluidly coupled to the outlet of the two or more preconcentrators; a separation pump; and a controller. Each separation column is disposed in a separation path fluidly coupled between an inlet of the corresponding preconcentrator and the separation pump. A sampling valve is interposed between the outlet of the two or more preconcentrators and the sampling pump; whereas, a separation valve is disposed in each of the separation paths between the corresponding preconcentrator and the separation pump. The controller is operably coupled to the sampling valve and each of the separation valves.

During a sampling phase, the sampling pump operates to draw the analyte in a first direction into the inlet of the two or more preconcentrators and the controller actuates the sampling valve to an open position and each of the separation valves to a closed position.

During a separation phase, the separation pump operates to pull gas through the separation paths towards the separation pump, and the controller actuates the sampling valve to a closed position and each of the separation valves in succession to an open position.

In some embodiments, a flow restrictor may be disposed in the inlet of the two or more preconcentrators.

The gas chromatography architecture further includes a detector disposed in each of the separation paths, such that the detector is located between the corresponding preconcentrator and the separation valve. In some embodiment, an array of detectors is disposed in each separation path, where the array of detectors includes a capacitive detector and a photoionization detector.

In some embodiment, a second separation pump is fluidly coupled to the outlet of the two or more preconcentrators and operates to push gas through the two or more preconcentrators towards the inlet of the two or more preconcentrators.

The gas chromatography architecture may also include a preliminary preconcentrator having an inlet fluidly coupled to the inlet of the two or more preconcentrators and an outlet fluidly coupled to an inlet of the sampling pump, where the sampling pump operates to draw the analyte into the preliminary preconcentrator during the sampling phase.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
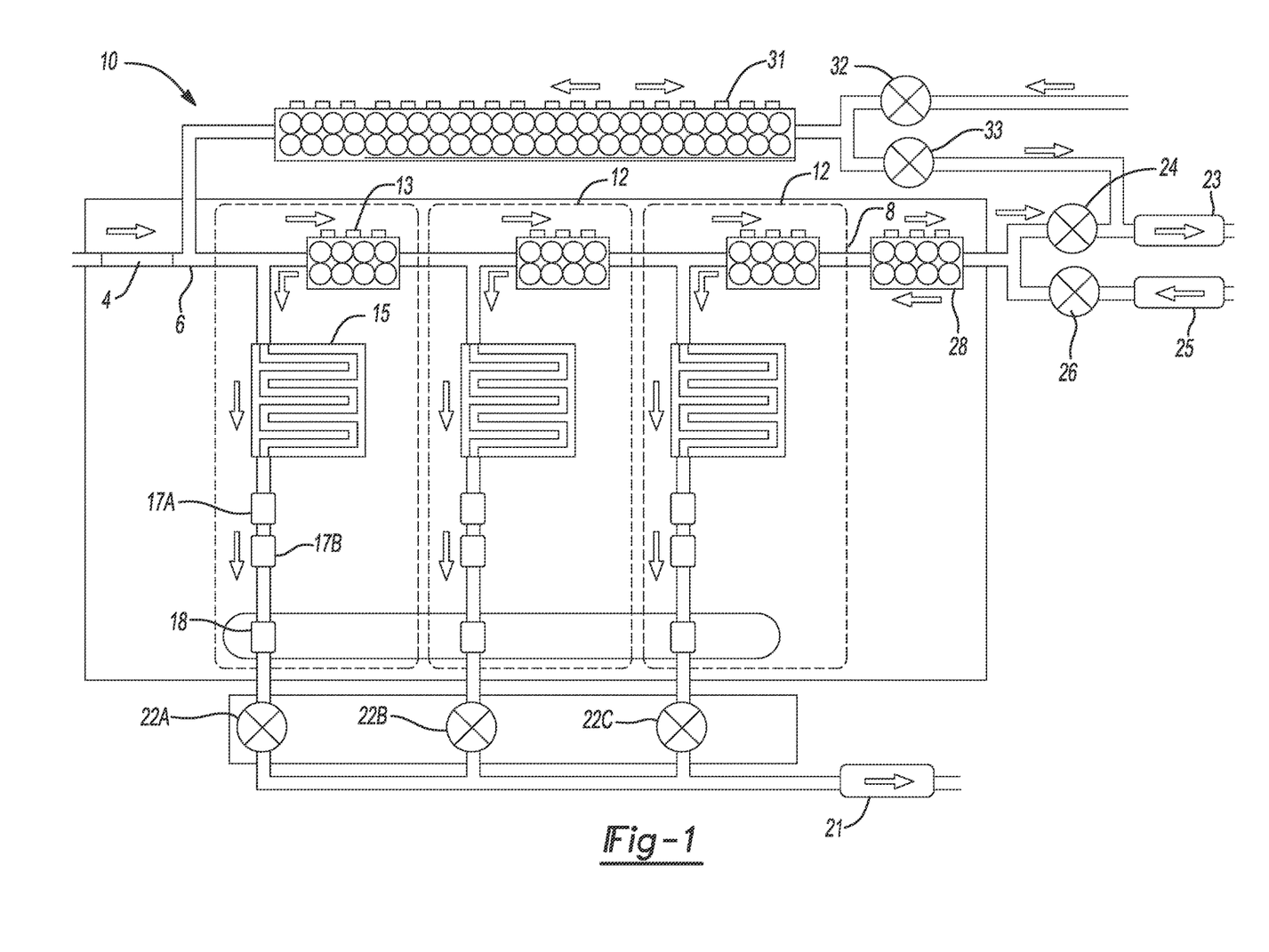
FIG. 1 depicts an example embodiment of the progressive cellular architecture of a gas chromatograph.

FIG. 1 depicts an example embodiment of a gas chromatograph 10 with a progressive cellular architecture. The progressive cellular architecture is designed for analyzing broad ranges of compounds in an energy efficient manner. In the progressive cellular architecture, each cell 12 and its components are assigned an index, e.g., 1, 2, and 3. The higher-index cells and components are used to analyze heavier chemical analyte vapors that are typically less volatile, and the higher-index preconcentrators are located upstream in the sampling flow. The lighter chemical analytes easily breakthrough the higher-index preconcentrators and get trapped by the stronger lower-index preconcentrators that are located downstream in the sampling flow. A de facto pre-sorting of the chemicals is achieved during sampling. While three stages are shown, it is readily understood that more or less stages (i.e., cells) fall within the scope of this disclosure.

In an example embodiment, two or more cells are cascaded together. The two or more cells are configured with an inlet 6 to receive an analyte and an outlet 8. Of note, the inlet is configured without a valve. In general, valves may inadvertently absorb or adsorb and subsequently release target chemical analyte molecules, thereby interfering with quantitative analysis. Thus, implementing a progressive cellular architecture without an inlet valve is an important aspect of this design and will be further described below.

Each cell 12 is comprised generally of a microfabricated preconcentrator 13 and a microfabricated separation column 15 that are customized for collecting and separating compounds within a specific volatility range. A wide volatility range can be covered by the use of multiple cells that are cascaded in the appropriate order. More specifically, the preconcentrators 13 are fluidly coupled together in series. Each preconcentrator 13 includes a chamber through which the analyte passes and sorbent material within the chamber. In the example embodiment, the surface area of the sorbent material residing in a given preconcentrator increases from the inlet 6 to the outlet 8 across each of the preconcentrators.

A separation column 15 is associated with each preconcentrator 13 of the two or more preconcentrators. The progressive cellular architecture also includes a first separation pump 21. Each separation column 15 is disposed in a separation path fluidly coupled between an inlet of the corresponding preconcentrator and the first separation pump 21. A separation valve 22A, 22B, 22C is also disposed in each of the separation paths between the corresponding preconcentrator and the first separation pump 21. The first separation pump 21 operates to pull gas through the separation paths towards the separation pump during a separation phase as will be further described below.

A detector (or an array of detectors) is disposed in each of the separation paths as well. Specifically, the detector is located between the corresponding separation column and the corresponding separation valve. In one embodiment, the detector is further defined as one of a capacitive detector or a photoionization detector. In another embodiment, the array of detectors includes a capacitive detector and a photoionization detector, where the photoionization detector is downstream from the capacitive detector. In yet another embodiment, the array of detectors 16 includes two capacitive detectors 17A, 17B and a photoionization detector 18, where the photoionization detector is downstream from the two capacitive detectors. These arrangements are merely illustrative and other types of detectors are contemplated by this disclosure.

Lastly, a controller (not shown) is operably coupled to each of the valves in the gas chromatograph 10. In an exemplary embodiment, the controller is implemented as a microcontroller. It should be understood that the logic for the controller can be implemented in hardware logic, software logic, or a combination of hardware and software logic. In this regard, controller can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller performs a function or is configured to perform a function, it should be understood that controller is configured to do so with appropriate logic (such as in software, logic devices, or a combination thereof).

In a simplified embodiment, a sampling pump 23 is fluidly coupled to the outlet 8 of the two or more preconcentrators. A sampling valve 24 is also interposed between the outlet 8 and the sampling pump 23. In some embodiments, a carrier gas filter 28 is interconnected between the outlet 8 of the two or more preconcentrators and the sampling valve 24. The carrier gas filter captures chemicals and moisture that may be present in the carrier gas used in separation. The filter may be embodied as a fused silica chamber that is packed with one or more sorbent materials. Exemplary sorbent materials for the carrier gas filter may include various types of graphitized carbon blacks and molecular sieves. In the separation phase this filter may remain unheated, allowing it to trap chemicals and water molecules as intended. Subsequently, it may be regenerated by heating in the presence of gas flow that is opposed in direction to the separation flow, thereby expelling the captured species back toward the source of the carrier gas. For operational efficiency the regeneration can be performed during the sampling phase of the next analytical cycle.

During a sampling phase, the sampling pump 23 operates to draw the analyte in a first direction into the inlet 6 of the two or more preconcentrators. In the sampling phase, the sampling valve 24 is actuated by a controller to an open position and each of the separation valves 22A, 22B, 22C are actuated to a closed position. During the separation phase, the separation pump 21 operates to pull gas through the separation paths towards the separation pump 21. In the separation phase, the sampling valve 24 is closed and each of the separation valves 22A, 22B, 22C are actuated by the controller in succession to an open position.

In a more complex embodiment, a preliminary preconcentrator 31 and a second separation pump 25 are added to the architecture as seen in FIG. 1. For applications where the chemical analyte concentrations vary widely, an analyzer is generally required to collect and analyze vastly different sample volumes. In the progressive cellular architecture, if the sample volume is changed significantly, the chemical distribution among the cells would be changed, which could affect the quality of the analysis results. This problem is addressed by incorporating the preliminary preconcentrator 31. The preliminary preconcentrator 31 is an optional element having an inlet fluidly coupled to the inlet 6 and an outlet fluidly coupled to the inlet of the sampling pump 23. To support the preconcentrator 31, a first preliminary valve 32 and a second preliminary valve 33 are also added to the architecture. The first preliminary valve 32 is fluidly coupled to the outlet of the preliminary preconcentrator 31 and ambient air; whereas, the second preliminary valve 33 is fluidly coupled between the outlet of the preliminary preconcentrator 31 and the sampling pump 23. The preliminary preconcentrator 31 may be used to first accumulate the chemical analyte vapors and, at the end of the accumulation period, transfer the chemical molecules into the progressively arranged two or more preconcentrators using a prescribed flow velocity and duration of carrier gas.

During a sampling phase, valves 22A, 22B, 22C, 32, 24 and 26 are closed while valve 33 is open. The sampling pump 23 operates to draw the analyte into the preliminary preconcentrator 31. Thus, the chemicals are collected by the sorbents in the preliminary preconcentrator 31 during this phase.

During a transfer phase, the chemicals collected by the preliminary preconcentrator 31 are transferred to the progressive cells 12. First, valves 22A, 22B, 22C, 33 and 26 are closed while valves 32 and 24 are open. The preliminary preconcentrator 31 is heated to release the collected chemicals. With the sampling pump operating, the chemicals released by the preliminary preconcentrator 31 are carried by the ambient air flow into the two or more preconcentrators 13.

In some embodiments, a flow restrictor 4 is disposed in the inlet 6. During the transfer phase, a vapor sample is also being pulled through the flow restrictor 4 into the two or more preconcentrators 13. The flow introduces an extra quantity of chemicals into the two or more preconcentrators which can be well-characterized for quantitative analysis. The purpose of the flow restrictor 4 in this phase is to ensure that the preliminary preconcentrator 31 receives enough flow for transferring the desorbed chemicals.

During the separation phase, the first separation pump 21 operates to pull gas through the separation paths and the second separation pump 25 pushes gas through the separation paths. Valves 32, 33 and 24 are closed while valve 26 is open. For separation by a given cell, the valve corresponding to the cell is open while the other two valves are closed. For example, for separation by cell 3, valve 22A is open and valves 22B, 22C are closed. When the mass flow rates provided by both the two separation pumps 21, 25 are equal, there is zero flow through the flow restrictor 4. Consequently, all chemicals desorbed from each preconcentrator are injected into the corresponding separation column for analysis. If there is a mismatch between the mass flow rates provided by the two separation pumps 21, 25, there is an undesired flow through the flow restrictor 4. This undesired flow can be minimized by a large flow resistance in the flow restrictor 4.

Further variants of the progressive cellular architecture are envisioned by this disclosure. For example, the function of the two separation pumps 21, 25 can be provided by a single separation pump 25 connected between valve 26 and the downstream end of valves 22A, 22B, 22C in the separation flow paths. In this configuration, during separation, the single separation pump circulates the carrier gas for the separation. The exhaust of the separation is circulated back into the carrier gas filter 28, which blocks the analyte chemicals from re-entering the two or more preconcentrators 13 while allowing the carrier gas to pass through. The carrier gas filter can be regenerated, i.e., cleaned for the next analysis cycle, for example by being heated during sampling phase (for the case without the preliminary preconcentrator 31) or during transfer phase (for the case with the preliminary preconcentrator 31). The accumulated chemicals are then released from the carrier gas filter 28 and pulled out into the ambient by the sampling pump 23.

For certain analyte chemicals that do not interfere with the materials in the valves, it is envisioned that the flow restrictor 4 may be replaced by a two-way valve in some embodiments. In this case, one of the two separation pumps 21, 25 can be eliminated.

Figure 2A:
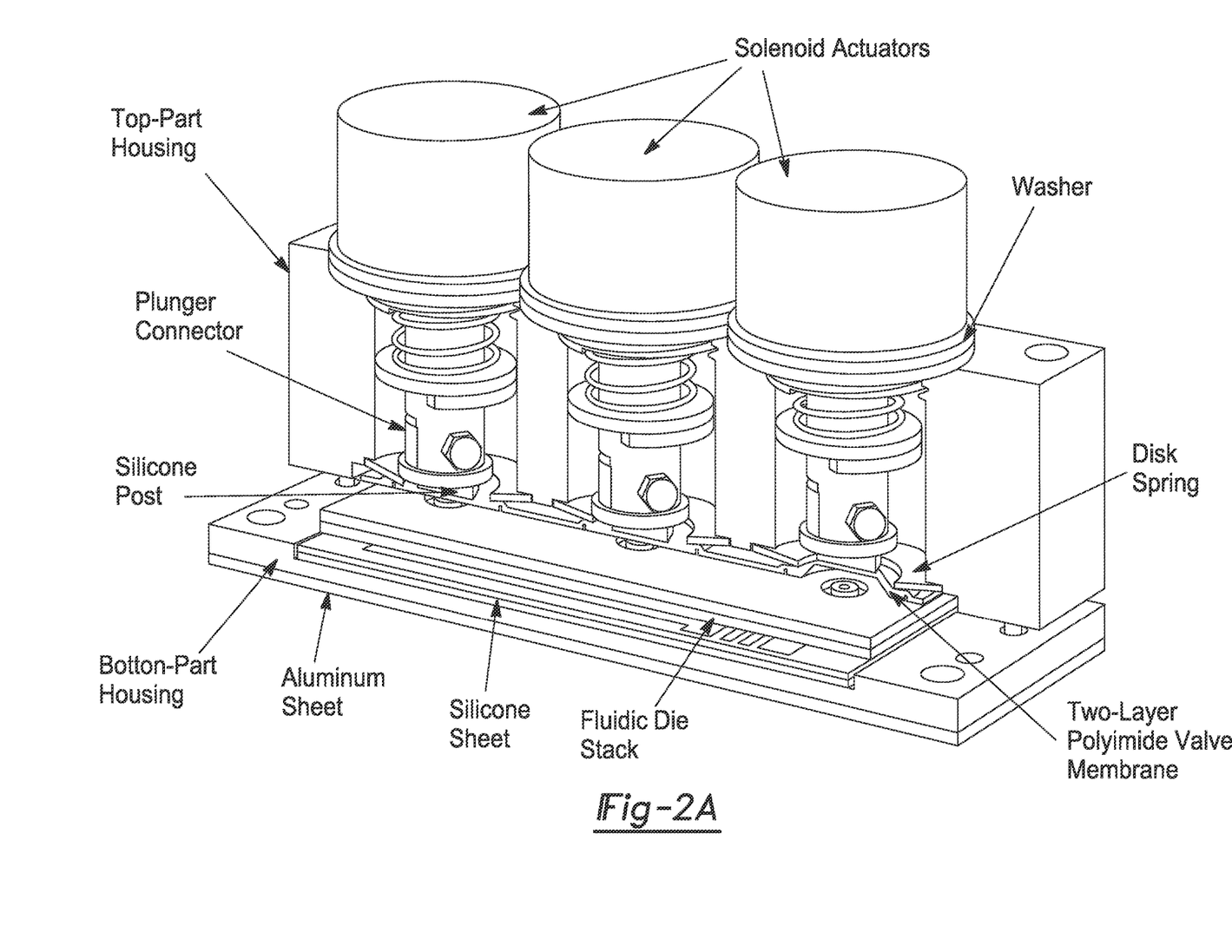
FIG. 2A is a perspective view of microvalve module suitable for use in the gas chromatograph.
Figure 2B:
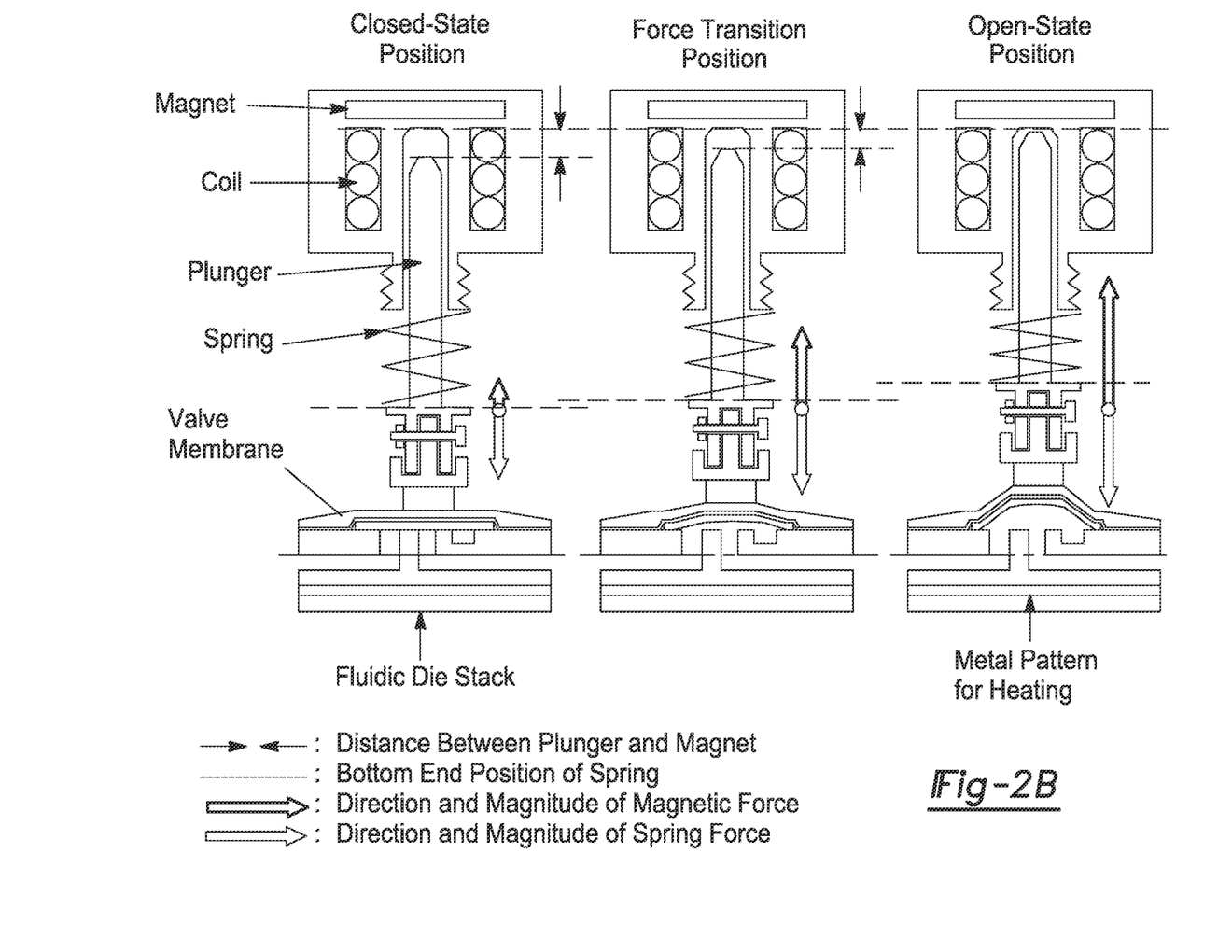
FIG. 2B is a cross-sectional view of the microvalve module illustrating valve actuation.

Referring to FIGS. 2A and 2B, the valves in the progressive cellular architecture may implemented as microvalve modules, which comprise microfabricated fluidic channels and valve seats integrated into fused silica fluidic die stack. Thin-film metal heaters and thermistors may be integrated within the fluidic die stack to provide heating. Polyimide valve membranes that are pinned or bonded to at least one layer may be coupled to external solenoid latching actuators. To open the valve, the valve membrane is pulled up by the actuator, and latched in position by a permanent magnet; to close the valve, the valve membrane is pushed down by the actuator, and held in place by a spring as best seen in FIG. 2B. Compared to other types of actuators (such as piezoelectric or electrostatic actuators), the solenoid actuators provide larger actuation displacement, which may simplify the valve assembly; they also offer smaller footprints, allowing monolithic integration of multiple microvalves. With the latching actuator feature, the energy required for maintaining the actuated state of the microvalve actuation is greatly diminished relative to the energy required for the transition into the actuated state. A customized 3-D printed housing may be used for the assembly. While reference is made to a particular implementation for the microvalves, other implementations also fall within the scope of this disclosure.

Figure 3:
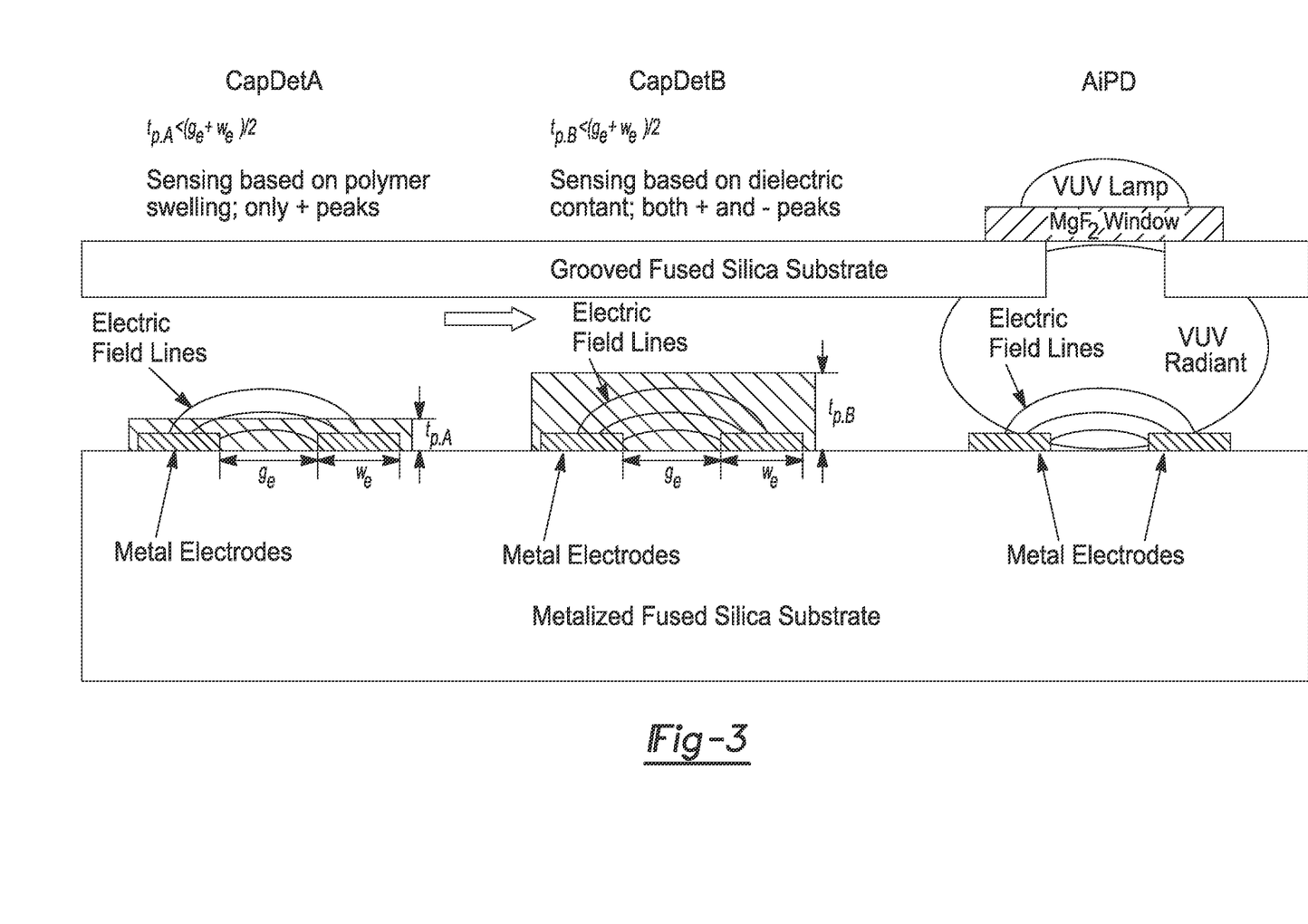
FIG. 3 is a cross-sectional view of an example array of detectors suitable for use in the gas chromatograph.
Figure 4A:
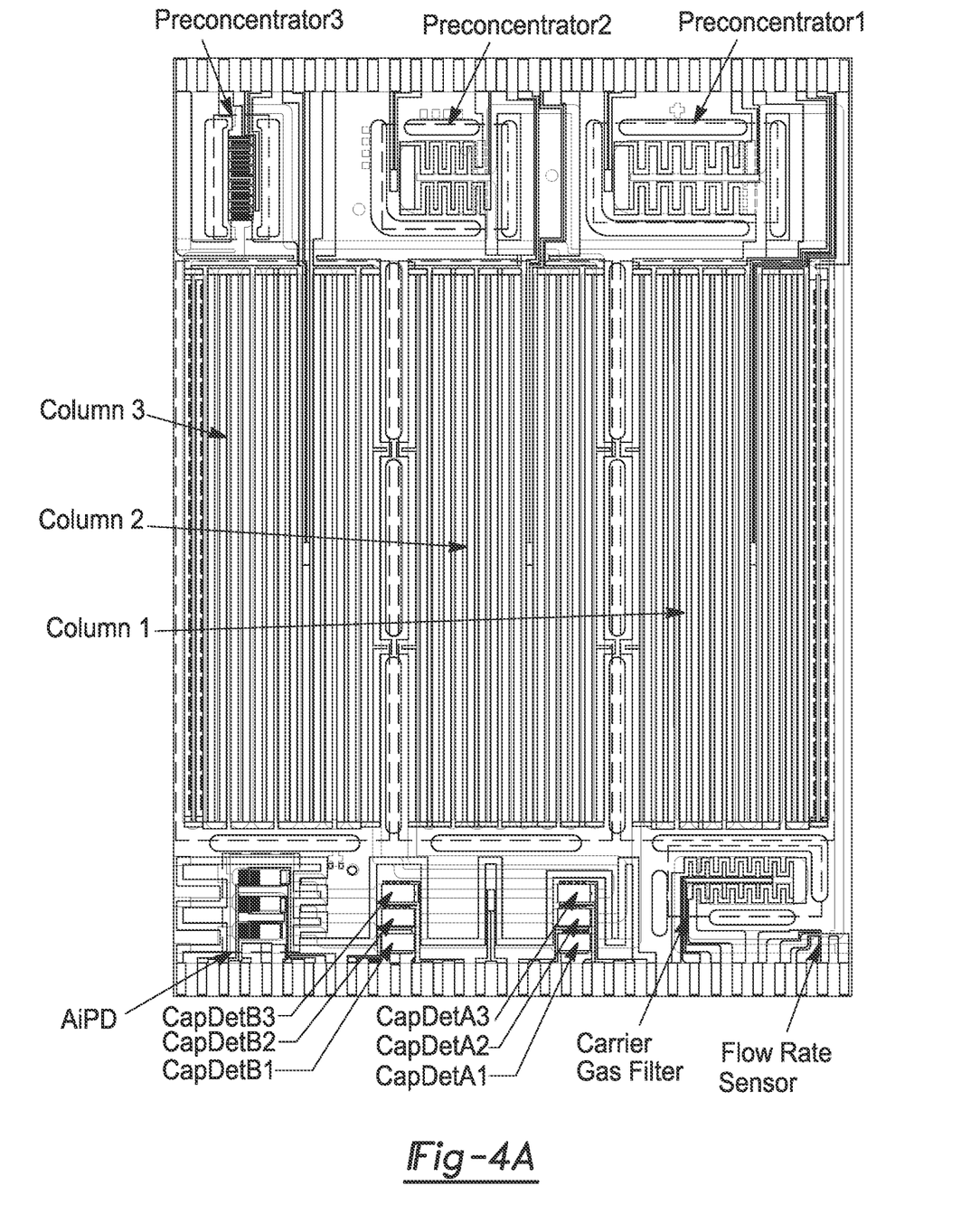
FIG. 4A is an overlaid layout of a grooved die and a metallized die of a monolithic integration of the gas chromatograph.
Figure 4B:
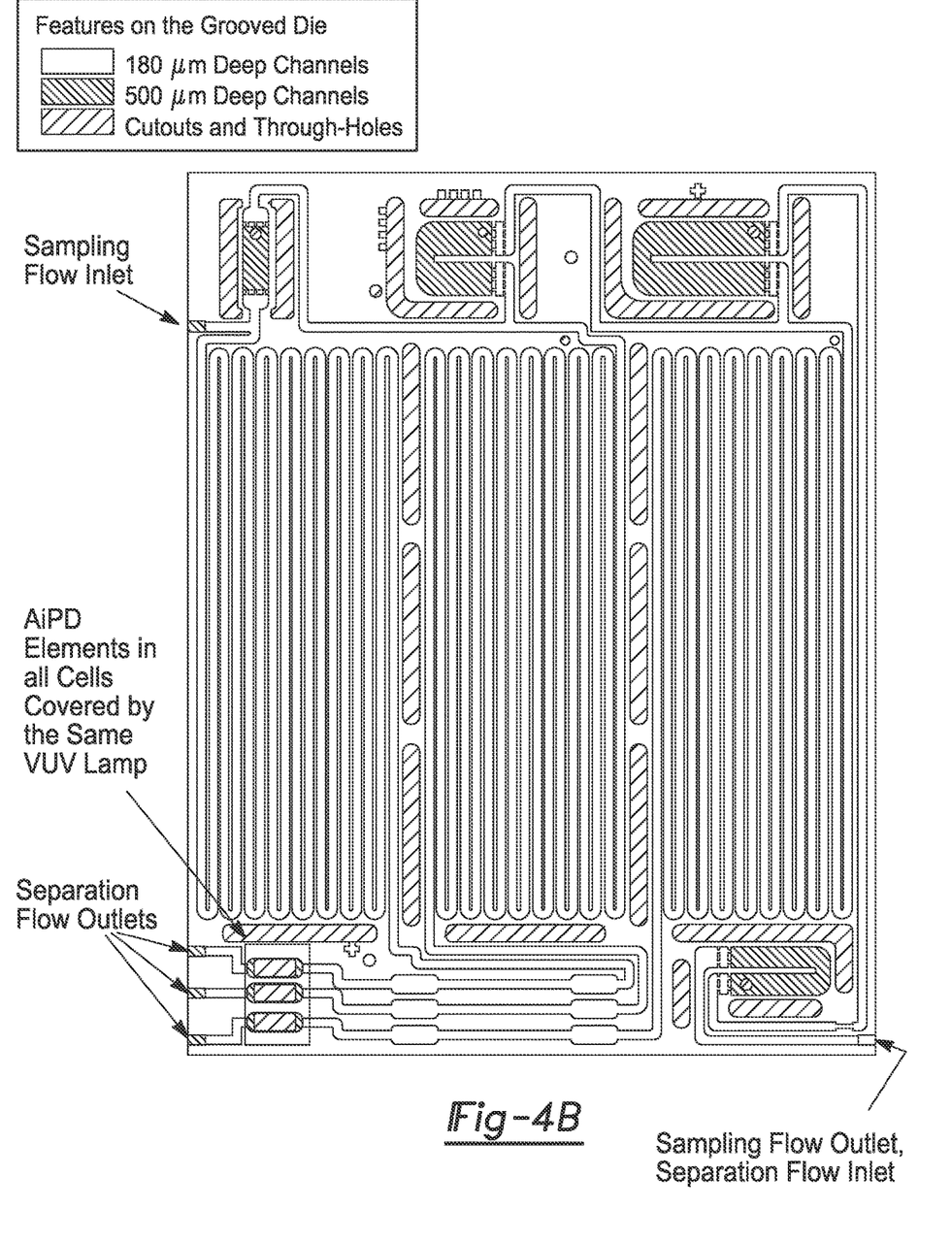
FIG. 4B is the layout of the grooved die.
Figure 4C:
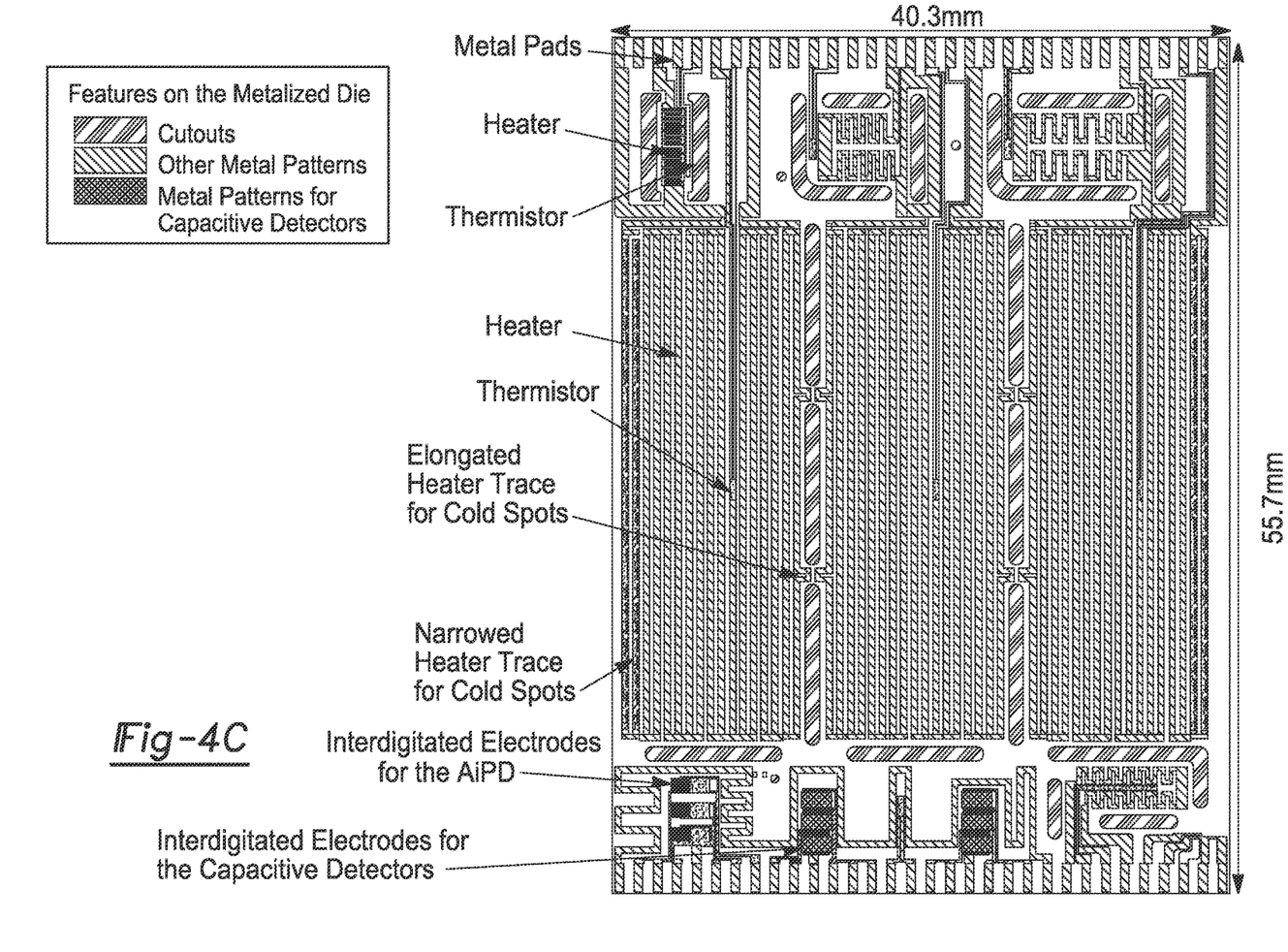
FIG. 4C is the layout of the metallized die.

In the example embodiment, the progressive cellular architecture incorporated an array of detectors in each separation path. More specifically, the array is comprised of two capacitive detectors (CapDetA and CapDetB) and an arrayed integrated photoionization detector (AiPD). The capacitive detectors may incorporate closely-spaced interdigitated thin-film metal electrodes on a fused silica substrate that is coated with a vapor-sensitive polymer layer as seen in FIG. 3. The polymer response includes both swelling and changes in the dielectric constant, which contribute to capacitance change ($\Delta C$). Different polymer thicknesses have been shown to provide complementary signals. The interdigitated electrodes have widths ($w_e$) and gaps ($g_e$) of 1 µm. The first detector, CapDetA, uses a polymer thickness of 0.25 µm. Because this dimension is substantially smaller than the mean value of $w_e$ and $g_e$, the electric field lines extend beyond the thickness of the polymer. Its capacitance change, $\Delta C$, is always positive, dominated by the swelling response of the polymer. The second detector, CapDetB, uses a polymer thickness of 1.6 µm. Its capacitance change, $\Delta C_B$, can be either positive or negative, depending on the dielectric constant of the vapor species relative to that of the polymer. Whereas the swelling response of the polymer layer does not contribute to $\Delta C_B$, the change in permittivity caused by the penetration of the vapor molecules has a strong effect because the electric field lines are mostly contained within the polymer. In the example embodiment, the polymer used in the capacitive detectors in Cell 2 (i.e., CapDetA-2 and CapDetB-2) and Cell 3 (i.e., CapDetA-3 and CapDetB-3) can be polydimethylsiloxane (PDMS), which can be the same material used as the separation column stationary phase in these two cells. The polymer used in the capacitive detectors in Cell 1 (i.e., CapDetA-1 and CapDetB-1) can be divinylbenzene or an equivalent polymer, which can be the same material used as the separation column stationary phase in Cell 1. The capacitive detectors are inherently power efficient, requiring power only for the readout circuitry. The readout circuit will be provided by commercial capacitance-to-digital converter chips (e.g., AD7746 from Analog Devices, Inc., MA), which will only consume 2 mW power.

With continued reference to FIG. 3, the AiPD is comprised of two thin-film metal electrodes on a fused silica substrate. When exposed to vacuum ultraviolet (VUV) radiation the vapor molecules are ionized and if a bias voltage exists between the two electrodes an electrical current is established between the two electrodes by the ionized species. In the example embodiment, the cells may incorporate an array of AiPD elements located in separate fused silica gas flow channels that are routed beneath a single shared VUV lamp, minimizing the power and volume consumed by the AiPD. Each fused silica channel may have an upper opening covered by a VUV lamp, with or without a window. The VUV lamp may be a commercial 10.6 eV lamp (e.g., Part #043-257, Mocon Inc., CO). The AiPD elements and their electronics consume 100 mW power in total. Other types of light source are also contemplated by this disclosure.

The detectors may incorporate heating capabilities provided by thin-film metal heaters and thermistors. The heating capability has been shown to prevent peak tailing of surface-binding compounds (such as the phosphonates) and minimize peak broadening of low-volatility compound in the capacitive detectors.

Figure 5:
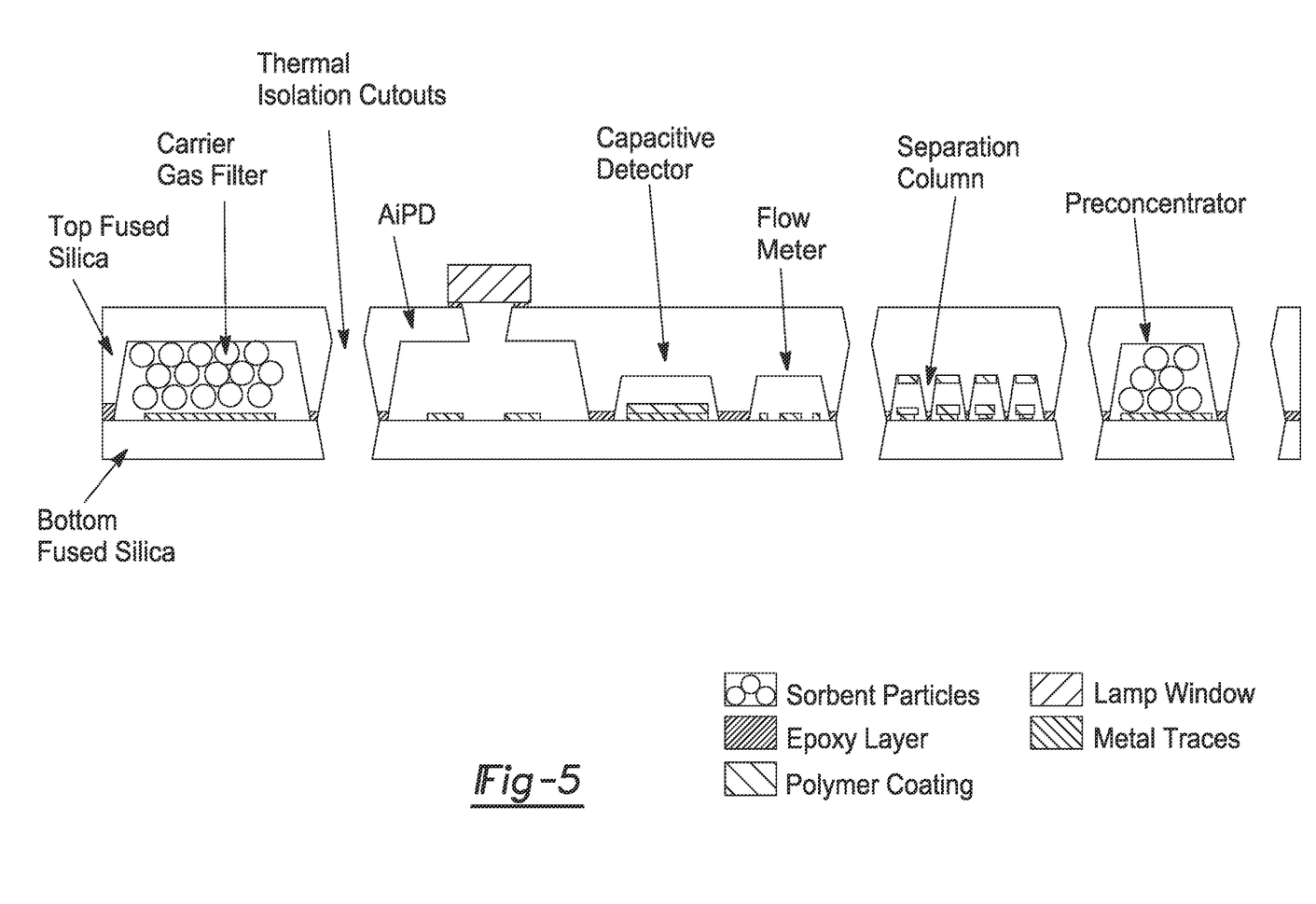
FIG. 5 is a cross-sectional view of the monolithic integration of the gas chromatograph.

Within the progressive cellular architecture, many components can be monolithically integrated. FIGS. 4A-4C and FIG. 5 illustrates an example of monolithic integration of a multi-sensing progressive cellular architecture (MPCA) chip. The MPCA chip incorporates a fused silica grooved die, a fused silica metallized die and an MgF$_2$ window (FIG. 5). An exemplary MPCA chip incorporates three cells, each incorporating a preconcentrator, a separation column, a CapDetA, a CapDetB, and an AiPD element. In addition to the differences in the sorbent materials, the preconcentrators in the three cells may have different volumes of sorbent chambers. The separation columns may have different channels geometries and stationary phase coating materials. The electrodes of the capacitive detectors and AiPD may be in the form of interdigitated electrodes, which may have different width and gap values. For example, the capacitive detectors may incorporate electrodes with 1.5 µm width and gap; whereas, the AiPD may incorporate electrodes with 10 µm width and 100 µm gap. The MPCA chip also incorporates a carrier gas filter. A flow rate sensor may also be incorporated. All the integrated components may be temperature-controlled by embedded thin-film metal heaters and thermistors. Cold spots may be minimized by heater geometries. In one implementation, the fabricated and assembled MPCA chip has form factor of 55.7×40.3×2.2 mm$^3$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gas chromatography architecture, comprising:
two or more preconcentrators coupled together in series, the two or more preconcentrators having an inlet configured without a valve therein to receive an analyte and an outlet, each preconcentrator comprising a chamber through which the analyte passes and sorbent material within the chamber, wherein surface area of sorbent material residing in a given preconcentrator increases from the inlet to the outlet across the two or more preconcentrators;
a sampling pump fluidly coupled to the outlet of the two or more preconcentrators;
a sampling valve interposed between the outlet of the two or more preconcentrators and the sampling pump;
a first separation pump;
for each preconcentrator of the two or more preconcentrators, a separation path fluidly coupled between an inlet of the given preconcentrator and the first separation pump;
a separation column in each separation path;
a second separation pump fluidly coupled to the outlet of the two or more preconcentrators and operates to push gas through the two or more preconcentrators towards the inlet of the two or more preconcentrators;
a separation valve disposed in each of the separation paths between the corresponding preconcentrator and the first separation pump; and
a controller operably coupled to the sampling valve and each of the separation valves.

2. The gas chromatography architecture of claim 1 further comprises a flow restrictor disposed in the inlet of the two or more preconcentrators.

3. The gas chromatography architecture of claim 1 further comprises a detector disposed in each of the separation paths, such that the detector is located between the corresponding preconcentrator and the separation valve.

4. The gas chromatography architecture of claim 1 further comprises an array of detectors disposed in each separation path, where the array of detectors includes a capacitive detector and a photoionization detector.

5. The gas chromatography architecture of claim 1 wherein the sampling pump operates to draw the analyte in a first direction into the inlet of the two or more preconcentrators during a sampling phase, and the first separation pump operates to pull gas through the separation paths towards the separation pump during a separation phase.

6. The gas chromatography architecture of claim 5 wherein the controller actuates the sampling valve to an open position and each of the separation valves to a closed position during the sampling phase; and the controller actuates the sampling valve to a closed position and each of the separation valves in succession to an open position during the separation phase.

7. The gas chromatography architecture of claim 5 further comprises a preliminary preconcentrator having an inlet fluidly coupled to the inlet of the two or more preconcentrators and an outlet fluidly coupled to an inlet of the sampling pump, where the sampling pump operates to draw the analyte into the preliminary preconcentrator during the sampling phase.

8. The gas chromatography architecture of claim 7 further comprises a first preliminary valve disposed between the preliminary preconcentrator and the sampling pump, where the controller actuates the first preliminary valve to an open position and actuates the sampling valve and each of the separation valves to a closed position during the sampling phase.

9. A gas chromatography architecture, comprising:
one or more preconcentrators coupled together in series, the one or more preconcentrators having an inlet configured to receive an analyte and an outlet, each preconcentrator comprising a chamber through which the analyte passes and sorbent material within the chamber, wherein surface area of sorbent material residing in a given preconcentrator increases from the inlet to the outlet across the one or more preconcentrators;
a sampling pump fluidly coupled to the outlet of the one or more preconcentrators;
a sampling valve interposed between the sampling pump and the outlet of the two or more preconcentrators;
a gas filter interposed between the sampling valve and the outlet of the one or more preconcentrators;
a first separation pump;
for each preconcentrator of the one or more preconcentrators, a separation path fluidly coupled between an inlet of the given preconcentrator and the first separation pump;
a separation column in each separation path;
a second separation pump fluidly coupled to the outlet of the one or more preconcentrators and operates to push gas through the one or more preconcentrators towards the inlet of the one or more preconcentrators;
a separation valve disposed in each of the separation paths between the corresponding preconcentrator and the first separation pump;
a detector disposed in each of the separation paths, where each detector is located between the corresponding preconcentrator and the separation valve; and
a controller operably coupled to the sampling valve and each of the separation valves.

10. The gas chromatography architecture of claim 9 further comprises a vacuum ultraviolet lamp configured to radiate molecules adjacent to the detectors, such that each of the detectors share the same vacuum ultraviolet lamp.

11. The gas chromatography architecture of claim 9 further comprises an array of detectors disposed in each separation path, where the array of detectors are fluidly coupled in series with the separation path and include two capacitive detectors and a photoionization detector.

12. The gas chromatography architecture of claim 11 wherein the photoionzation detector is disposed downstream from the two capacitive detectors.

13. The gas chromatography architecture of claim 11 wherein the two capacitive detectors and the photoionization detector are in form of interdigitated electrodes.

14. The gas chromatography architecture of claim 9 further comprises a flow restrictor disposed in the inlet of the one or more preconcentrators.

15. The gas chromatography architecture of claim 9 wherein the sampling pump operates to draw the analyte in a first direction into the inlet of the two or more preconcentrators during a sampling phase, and the separation pump operates to pull gas through the separation paths towards the separation pump during a separation phase.

16. The gas chromatography architecture of claim 15 wherein the controller actuates the sampling valve to an open position and each of the separation valves to a closed position during the sampling phase; and the controller actuates the sampling valve to a closed position and each of the separation valves in succession to an open position during the separation phase.

17. The gas chromatography architecture of claim 15 further comprises a preliminary preconcentrator having an inlet fluidly coupled to the inlet of the two or more preconcentrators and an outlet fluidly coupled to an inlet of the sampling pump, where the sampling pump operates to draw the analyte into the preliminary preconcentrator during the sampling phase.

18. The gas chromatography architecture of claim 17 further comprises a first preliminary valve disposed between the preliminary preconcentrator and the sampling pump, where the controller actuates the first preliminary valve to an open position and actuates the sampling valve and each of the separation valves to a closed position during the sampling phase.

19. A gas chromatography architecture, comprising:
two or more preconcentrators coupled together in series, the two or more preconcentrators having an inlet configured to receive an analyte and an outlet, each preconcentrator comprising a chamber through which the analyte passes and sorbent material within the chamber, wherein surface area of sorbent material residing in a given preconcentrator increases from the inlet to the outlet across the two or more preconcentrators;
a sampling pump fluidly coupled to the outlet of the two or more preconcentrators;
a sampling valve interposed between the outlet of the two or more preconcentrators and the sampling pump;
a preliminary preconcentrator having an inlet fluidly coupled to the inlet of the two or more preconcentrators and an outlet fluidly coupled to an inlet of the sampling pump, where the sampling pump operates to draw the analyte into the preliminary preconcentrator during a sampling phase;
a first separation pump;
for each preconcentrator of the two or more preconcentrators, a separation path fluidly coupled between an inlet of the given preconcentrator and the first separation pump;
a separation column in each separation path;
a separation valve disposed in each of the separation paths between the corresponding preconcentrator and the first separation pump;
a second separation pump fluidly coupled to the outlet of the two or more preconcentrators and operates to push gas through the two or more preconcentrators towards the inlet of the two or more preconcentrators;
a detector disposed in each of the separation paths, where each detector is located between the corresponding preconcentrator and the separation valve;
a vacuum ultraviolet lamp configured to radiate molecules adjacent to the detectors, such that each of the detectors share the same vacuum ultraviolet lamp; and
a controller operably coupled to the sampling valve and each of the separation valves.

\* \* \* \* \*

UNITED STATES PATENT AND TRADEMARK OFFICE
CERTIFICATE OF CORRECTION

| | | |
|---|---|---|
| PATENT NO. | : 11,927,574 B2 | Page 1 of 1 |
| APPLICATION NO. | : 17/120920 | |
| DATED | : March 12, 2024 | |
| INVENTOR(S) | : Yogesh Gianchandani et al. | |

It is certified that error appears in the above-identified patent and that said Letters Patent is hereby corrected as shown below:

In the Claims

At Column 10, Claim number 12, Line number 54, delete "photoionzation" and insert --photoionization--.

Signed and Sealed this
Eleventh Day of February, 2025

Coke Morgan Stewart
*Acting Director of the United States Patent and Trademark Office*